March 29, 1932.  P. W. THAYER  1,851,069
HYDRAULIC SEAL FOR GAS MAKING APPARATUS
Filed April 7, 1924   3 Sheets-Sheet 1
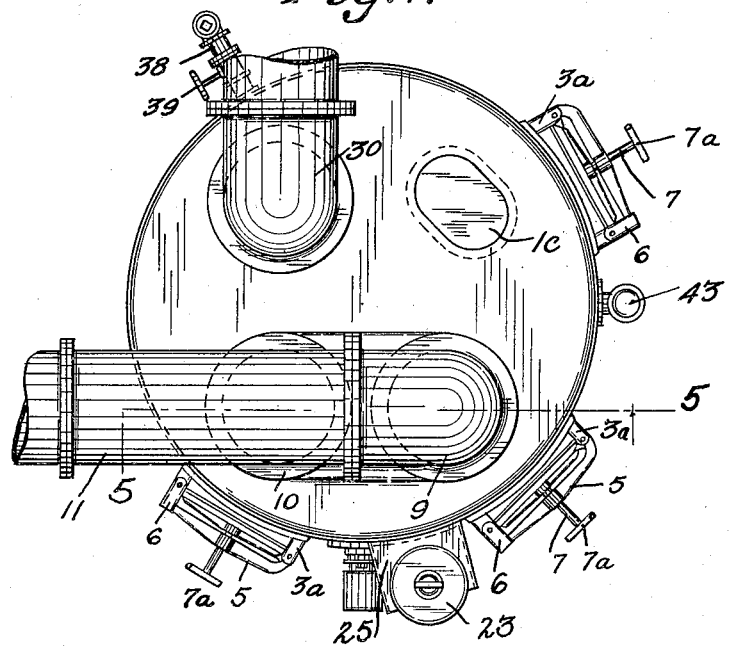
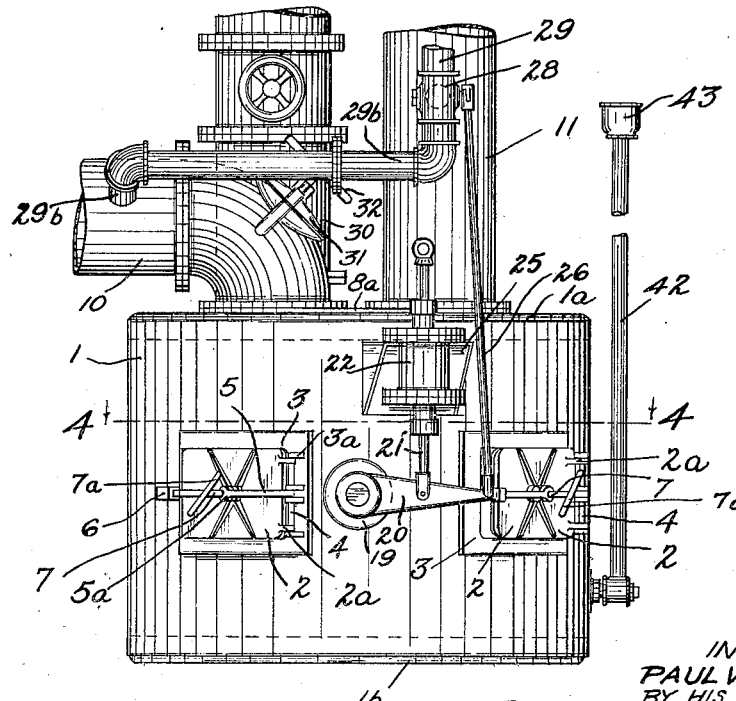
INVENTOR
PAUL W. THAYER
BY HIS ATTORNEY
James F. Williamson March 29, 1932.   P. W. THAYER   1,851,069
HYDRAULIC SEAL FOR GAS MAKING APPARATUS
Filed April 7, 1924   3 Sheets-Sheet 2

INVENTOR
PAUL W. THAYER
BY HIS ATTORNEY
James F. Williamson

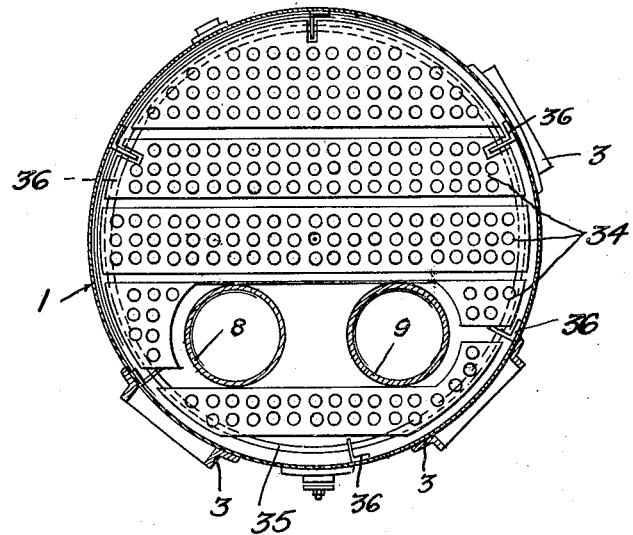
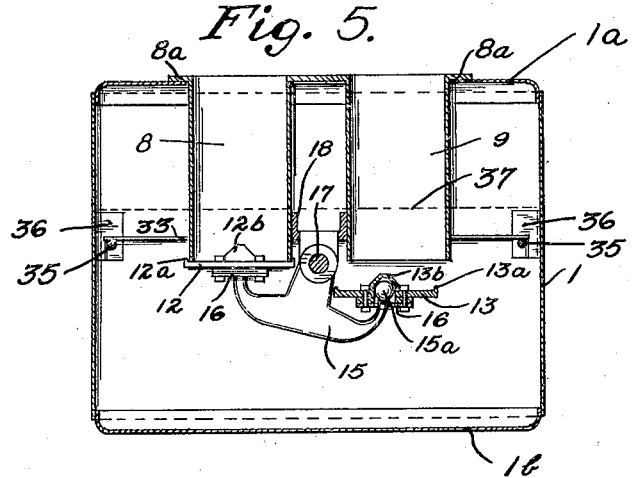

Patented Mar. 29, 1932                                                            1,851,069

UNITED STATES PATENT OFFICE

PAUL W. THAYER, OF MINNEAPOLIS, MINNESOTA, ASSIGNOR TO AMERICAN GAS CONSTRUCTION COMPANY, OF NEWTON, IOWA, A CORPORATION OF IOWA

HYDRAULIC SEAL FOR GAS MAKING APPARATUS

Application filed April 7, 1924. Serial No. 704,872.

This invention relates to a hydraulic seal, such as used in connection with gas making apparatus. The gas from the generating apparatus is passed through the seal so that the liquid seal is disposed between said apparatus and the washing and storing apparatus for the gas. The seal of the present invention is also adapted to break up the gas passing thereinto and to thus have a washing or scrubbing effect thereon. It is a more or less common practice in gas making to have a plurality of conduits through which the generated gas is discharged from the gas making apparatus, and in general, only one of these conduits is used for the passage of gas at one time.

It is an object of this invention to provide a hydraulic seal adapted to receive a plurality of gas discharging conduits, the ends of said conduits being open and extending below the level of the liquid maintained in said seal, and having a valve mechanism therein adapted alternately to open and close said conduits.

It is a further object of this invention to have such a seal and valve, which valve is oscillatable and carries a plurality of plate-like valves, preferably mounted on universal joints to cooperate with the ends of said conduits.

It is a further object of the invention to operate such a valve by means connected to the piston of a steam cylinder, which cylinder and means are disposed outside of the seal.

It is a further object of the invention to provide a hydraulic seal comprising a closed container into the top of which and at one side thereof, a plurality of conduits extend through which the gas passes into the seal and from the top of which and adjacent the other side of the container a conduit leads, through which the gas is discharged from the seal, which container has a perforated plate extending thereacross adjacent the lower end of the first mentioned conduits, which plate extends upwardly toward the side of the container from which the last mentioned conduit leads.

It is a further object of the invention to form this perforated plate of spaced elongated sections supported on means secured to the inner side of the container.

It is also an object of the invention to provide such a container with suitable overflow and drain means and with various openings for cleaning purposes.

It is still another object of the invention to provide mechanism for moving the above mentioned valve and holding the same in various positions.

These and other objects and advantages of the invention will be fully set forth in the following description made in connection with the accompanying drawings in which like reference characters refer to the same parts throughout the different views, and in which;

Fig. 1 is a top plan view of the device with certain parts omitted;

Fig. 2 is a view in front elevation of the device;

Fig. 4 is a horizontal section taken on the line 4—4 of Fig. 2, as indicated by the arrows;

Fig. 5 is a vertical section taken on the line 5—5 of Fig. 1, as indicated by the arrows, portions of the top of the container being omitted.

Figure 3:
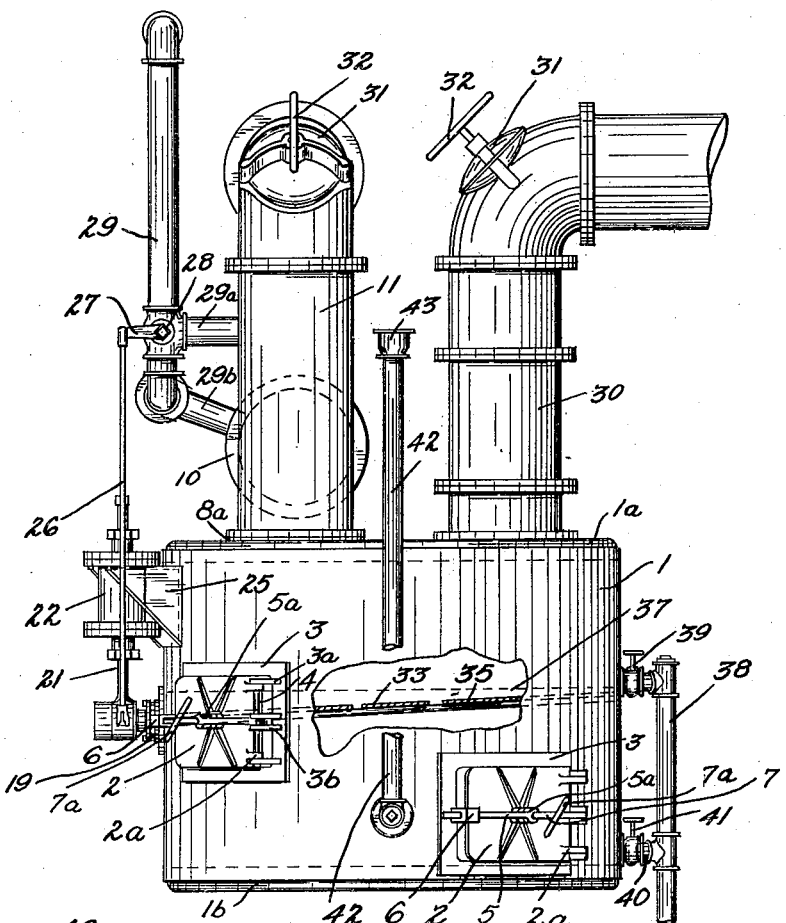
Fig. 3 is a view in side elevation of the device, a small portion thereof being shown in vertical section.

Referring to the drawings, the device comprises a closed container 1. While this container may be of various shapes, in the embodiment of the invention illustrated, the same is shown as substantially cylindrical in horizontal cross section and having a comparatively flat top and bottom portions 1a and 1b. The top portion is provided with a man hole 1c through which access may be had to the interior of the device, which man hole will, of course, be provided with a suitable covering not shown. The container 1 is also provided at spaced circumferential points thereabout, with openings in the peripheral wall. These openings are equipped with and closed by doors 2, one of said openings being adjacent the bottom of the device, and the others being adjacent the center thereof. The said openings have apertured plates 3 extending thereabout from which project the pintle lugs 3a carrying the pintle 4 on which the doors 2 are hinged by their lugs 2a. The plates 3 also have rising therefrom adjacent their central portions, and at one edge thereof, the lugs 3b between which is pivotally mounted a yoke 5 adapted to extend horizontally across the door 2 substantially centrally thereof, and the free end of which is adapted to be received in a yoke 6 hinged to plate 3. The yoke 5 has a hub 5a at its central portion threaded to receive a screw 7 having a cross handle 7a at its outer end. The screw 7, at its inner end, is adapted to bear against the door 2. The above description applies to all of the doors 2 illustrated.

Extending down into the container 1 through the top thereof are the inlet conduits 8 and 9 which are illustrated as having a flange 8a extending thereabout and between the same resting upon the top 1a of the container 1. Conduits 10 and 11 are connected, respectively, to the flange 8a and communicate, respectively, with the conduits 8 and 9. Co-operating with the lower open ends of the conduits 8 and 9 are valves in the form of plates 12 and 13 having the upwardly extending flanges 12a and 13a at their outer edges. Said plates are formed with upwardly extending substantially conical central portions 12b, 13b which are hollow to receive the rounded ball-like ends 15a of a lever 15, said plates being held on the ends of said lever by attaching plates 16 secured to plates 12 and 13 by a plurality of headed and nutted bolts thus forming universal joints between lever 15 and plates 12 and 13. As clearly shown in Fig. 5, lever 15 has two oppositely extending arms having upturned ends carrying the balls 15a and said lever has a central arm projecting upwardly therefrom formed with a hub secured to a shaft 17, which shaft is journaled in a bearing 18 secured between the conduits 8 and 9 and in a stuffing box 19 secured at the outer side of container 1. To the outer end of said shaft is connected a hub formed at one end of a lever 20, which lever extends substantially horizontally at one side of the container 1 and has pivotally connected thereto intermediate its ends, the lower end of a connecting rod 21 which extends into a steam cylinder 22 and is connected to the piston 24 therein. The rod 21 extends beyond the piston 24 and through the cylinder head 23. The cylinder 22 is supported from the side of container 1 by a bracket 25 which will be riveted or bolted to said container. The lever 20 has pivotally connected thereto at or adjacent its outer free end, the forked lower end of a rod 26 which extends upwardly and has its forked upper end connected to the outer end of an arm 27. The arm 27 is connected to the movable part of a three-way valve indicated at 28 and disposed in a conduit 29 having branches 29a and 29b leading respectively into conduits 10 and 11.

A conduit 30 communicates with an opening in the top 1a of the container, and extends upwardly and laterally therefrom. The conduits 10, 11 and 30 are illustrated as provided with man holes equipped with covers 31 and clamping handles 32 therefor. It will be noted that conduits 10 and 11 are adjacent one side of the container while the conduit 30 is adjacent the opposite side thereof. A perforated partition 33 extends across the interior of container 1 slightly above the lower ends of conduits 8 and 9 and said partition is inclined upwardly toward the side on which the conduit 30 is located. The said partition 33 is formed of a plurality of perforated plates 34 which are slightly spaced at their edges and are supported on means secured to the inner wall of the container 1. While any suitable supporting means might be provided for the plates 34, in the embodiment of the invention illustrated, said supporting means is shown as comprising a substantially circular rod 35 passing through suitable angle brackets 36 bolted or riveted to the wall of container 1. Container 1 is adapted to contain a liquid such as water, the level of which will be maintained just above the upper edge of the partition 33, as indicated by the dotted line 37 in Figs. 3 and 5, and it will be noted that the ends of conduits 8 and 9 extend some distance below this water level, and that these conduits also extend downwardly through the partition 33. An overflow pipe 38 communicates with the container 1 just above the upper edge of partition 33 to maintain the water level as described, which pipe is equipped with a valve 39. A drain pipe 40 is shown as communicating with the lower portion of overflow pipe 38 and pipe 40 is also equipped with a valve 41. A filling pipe 42 communicates with the container 1 at some distance above its bottom which pipe extends upward above the container and is shown as having a cup reservoir 43 at its upper end. The piston 24 in cylinder 23 is adapted to be operated by steam pipes 44 and 45 which are communicating, respectively, with ports at the opposite ends of said cylinder 23. The pipe 44 communicates with one opening or side of a four-way valve 46 and a pipe 45 communicates with one side or opening of a four-way valve 47, similarly disposed openings on said valves being connected by a pipe 48. A steam supply pipe 50 connects with one side of valve 46 and an exhaust steam pipe 49 connects with the opposite side of valve 46 and with the side of valve 47 opposite that to which pipe 48 is connected. The cylinder 23 is provided with ports 23b and 23c disposed at each side of its longitudinal center and a sufficient distance apart to just be covered by the edges of piston 24. A pipe 51 communicates with port 23b and with the side of valve 47 opposite that to which pipe 45 is connected and said pipe 51 has a branch 52 communicating with the port 23c. Check valves 53 are provided in pipes 51 and 52 so arranged as to permit passage of steam out of the cylinder but to prevent passage of steam into the cylinder therethrough.

Figure 6:
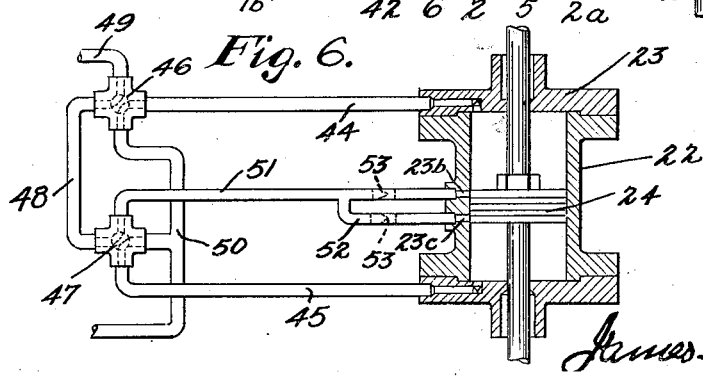
Fig. 6 is a diagrammatic view of the operating means for the valve, said view being in elevation, a portion thereof being shown in vertical section.

In operation, the gas from the gas making apparatus will come through one or the other of the conduits 10 or 11 and will be discharged into the seal through one of the conduits 8 or 9. The valves 12 and 13 are operated through the lever 15 and by the steam piston 24. When the plate valves 12 and 13 are in an entirely opened or closed position, the piston 24 is at one end of the cylinder 23. If it be desired to close conduit 8 by valve 12, as shown in Fig. 5, steam will be admitted from any suitable control means through the pipe 50. Valve 46 will be so turned that this steam passes therethrough into pipe 44 and into the upper end of cylinder 23. The valve 47 will be so turned that pipe 45 will communicate with pipe 48 and through valve 46 with exhaust pipe 49. The live steam entering the cylinder 23 will therefore force piston 24 down and lever 20 will be swung to move valve 12 to its closed position. If it be desired to open valve 12 and close conduit 9 by valve 13, the live steam will be admitted to pipe 50, valve 47 will be so turned as to connect pipes 50 and 45 and valve 46 will be turned to connect pipes 44 and 49 so that the live steam will be delivered to the cylinder 23 below piston 24. Pipe 44 will then be connected to exhaust pipe 49 so that the steam above the piston 24 will be exhausted through said exhaust pipe. The piston 24 will then be forced upwardly and valve lever 15 swung to open valve 12 and move valve 13 to closed position. It is sometimes desirable to have both conduits 8 and 9 open. For this purpose, live steam is supplied as usual to pipe 50 and valves 46 and 47 are set as shown in Fig. 6. Live steam is thus turned into the pipes 44 and 45 at each end of the cylinder 23. Pipe 51, as well as pipe 22 are connected to the exhaust pipe 49 through the valves 47 and 46 and pipe 48. If the piston 24 is in central position so as to cover the ports 23c and 23b, the live steam pressure will balance at each side of piston 24 and said piston will remain in its central position. Should said piston move downward, to uncover the upper port 23b, steam will be exhausted through the valve 53 and pipe 51 so that the pressure will be greater on the lower side of the piston. Said piston will then be moved upwardly to close said port 23b. If the piston should move upwardly so as to uncover the port 23c, the pressure would become greater on the top of the piston and the same will be forced back to central position. The gas passing into container 1 through the conduits 8 and 9, will pass below the surface of the water and escape in the water at the lower ends of said conduits. The gas will rise in the water and the bubbles thereof will move upwardly against the perforated plates 34. There will be some current in the seal as the gas passes out through the conduit 30 and the gas bubbles will travel upwardly along the lower side of the plates forming partition 33 and portions thereof will escape through the holes in said plates and through the cracks between the plates. The gas bubbles will be sliced up, as it were, and thus be broken up so than an efficient washing effect will be produced. The gas eventually all rises through partition 33 and passes out of the seal through the conduit 30 to the proper cleaning and storing apparatus.

With the type of apparatus disclosed, in certain parts of the gas making operations, steam is run into the conduits 10 and 11 in a direction away from the seal or container 1. The steam will pass into the conduit 10 when the valve 12 is closed and into the conduit 11 when the valve 13 is closed. This steam is passed into said conduits through the pipe or conduit 29 and the valve 28 is properly positioned to turn the steam into the proper conduit when the valves 12 and 13 are operated. This automatic operation of valve 28 takes place through the rod 26 connected to lever 20.

The container 1 is supplied with water through the pipe 42 and the proper level of water therein is maintained by the overflow pipe 38, the valve 39 therefore normally being open. When it is desired to drain the container, the valve 41 is opened and the water drains out through pipe 40. The container can then be cleaned by having access thereto through the doors 2 or the man hole 1c.

From the above description it is seen that applicant has provided a simple and efficient hydraulic seal for a gas making apparatus. The control valves 12 and 13 are conveniently arranged and constructed for efficient action. The universal joint by which the valves are connected to the lever 15 allow the plates to seat perfectly on the ends of conduits 8 and 9. With such apparatus, there is always an accumulation of carbon and hydrocarbon products, such as tar, which causes difficulty in operating valves of the ordinary type, such as sliding gate valves. The valves 12 and 13, it will be noted, pull directly away from their seats which are formed by the edges of the conduits 8 and 9, so that there is very little friction or tendency to stick and retard the operation of the valve. By providing the steam operation, the lever 15 is quickly operated and the valve plates 12 and 13 are slapped, as it were, against the ends of conduits 8 and 9 so that any deposit on the valve seats is apt to be expelled to one side or the other thereof and a perfect closing of the valve obtained. The gas passing into the seal is efficiently broken up and large bubbles of gas cannot pass through with the accompanying dangers. The seal is conveniently arranged for the accommodation of two inlet pipes so that one seal can be used with a double gas making set. The valve operating mechanism is also conveniently connected to the steam control valve. The entire apparatus is compact, efficient in operation and convenient and easily constructed. The apparatus has been thoroughly demonstrated in actual practice and found to be very successful.

It will, of course, be understood, that various changes may be made in the form, details, arrangement and proportion of the parts without departing from the scope of applicant's invention, which, generally stated, consists in a device capable of carrying out the objects above set forth, such as shown and described and defined in the appended claims.

What is claimed is:

1. A hydraulic seal and washer for gas having in combination, a closed container adapted to contain a body of liquid to a certain depth therein, two gas inlet conduits extending into said container below the level of liquid therein, and disposed at one side of said container, a discharge conduit connected to the top of said container at the opposite side thereof, a partition in said container comprising slightly spaced narrow perforated plates extending across said container and inclining upwardly away from said inlet conduits and disposed beneath the level of said liquid and above the lower ends of said inlet conduits, and means secured to said container on which said plates rest whereby gas issuing from said inlet conduits will pass up and along and beneath said partition and be successively divided into small portions.

2. A hydraulic seal for gas having in combination, a closed container adapted to contain liquid, two gas inlet conduits extending into said container and below the level of liquid therein and disposed at one side of said container, a discharge conduit connected to the top of said container at the opposite side thereof, a perforated partition surrounding said inlet conduits extending across said container in an upwardly inclined direction and being disposed a short distance above the lower end of said first mentioned conduit and below the level of liquid in said container, an outlet pipe communicating with said container just above the upper end of said partition forming an overflow device and a drain outlet at the bottom of said container.

3. A device of the class described having in combination, a container adapted to contain liquid, an inlet conduit for gas extending into said container and having its outlet end below the level of the liquid therein, a discharge conduit connected to the top of said container and a perforated partition extending across said container in an upwardly inclined direction a short distance above the discharge end of said inlet conduit and below the level of the liquid in said container, whereby the gas issuing from said inlet conduit would pass along the under side of said partition and be broken up thereby.

4. A hydraulic seal for gas having in combination, a closed container adapted to contain a quantity of liquid therein, two conduits extending into said container and having open lower ends disposed below the level of liquid therein, an oscillating valve in said container carrying two plates oscillatably mounted and adapted to co-operate respectively with the ends of said conduits to open and close the same or to be held in an intermediate position with both conduits open, an operating member for said valve comprising a piston, a cylinder in which said piston is movable, means for delivering steam at the end portion of said cylinder and at intermediate portions therein, and controlling means for said steam to admit steam to different portions of said cylinder to move said valves alternately to close one conduit and open the other, or to hold said valves in position with both conduits open.

In testimony whereof I affix my signature.

PAUL W. THAYER.